US009432829B1

(12) United States Patent
Holthausen et al.

(10) Patent No.: US 9,432,829 B1
(45) Date of Patent: Aug. 30, 2016

(54) TECHNIQUES TO PROCESS TEXT MESSAGES FOR COMMUNICATION TO AN EMERGENCY SERVICE PROVIDER

(71) Applicant: Bandwidth.com, Inc., Raleigh, NC (US)

(72) Inventors: Peter Holthausen, Cary, NC (US); W Christopher Matton, Raleigh, NC (US); Gregory Rogers, Denver, CO (US)

(73) Assignee: Bandwidth.com, Inc., Raleigh, NC (US)

( * ) Notice: Subject to any disclaimer, the term of this patent is extended or adjusted under 35 U.S.C. 154(b) by 0 days.

(21) Appl. No.: 15/093,156

(22) Filed: Apr. 7, 2016

(51) Int. Cl.
H04M 11/04 (2006.01)
H04W 4/22 (2009.01)
H04W 4/12 (2009.01)
G06F 17/27 (2006.01)
H04W 4/00 (2009.01)

(52) U.S. Cl.
CPC ............. H04W 4/22 (2013.01); G06F 17/273 (2013.01); H04W 4/12 (2013.01)

(58) Field of Classification Search
CPC ..... H04W 4/22; H04W 4/12; H04W 76/007; H04W 4/14; H04W 4/00; H04M 2242/04; H04M 1/72552; H04M 11/04; G08B 25/016
USPC .......................................................... 455/404.1
See application file for complete search history.

(56) References Cited

U.S. PATENT DOCUMENTS 8,407,736 B2 * 3/2013 McClenny ........... G08B 27/005
340/286.02
2013/0331056 A1 * 12/2013 McKown ................ H04W 4/22
455/404.1

* cited by examiner

Primary Examiner — Huy C Ho
(74) Attorney, Agent, or Firm — Gregory Stephens

(57) ABSTRACT

Various embodiments are generally directed to an apparatus, method and other techniques for receiving an indication of one or more errors in a message, the message for communication to an emergency service provider and storing correction information including at least the one or more errors in the memory. Embodiments may also include receiving an indication to communicate the message to the emergency service provider and causing an original version of the message and a corrected version of the message to be communicated to the emergency service provider, the original version to include the one or more errors and the corrected version to include corrections for the one or more errors.

26 Claims, 11 Drawing Sheets

700

---

RECEIVE AN INDICATION OF ONE OR MORE ERRORS IN A MESSAGE, THE MESSAGE FOR COMMUNICATION TO AN EMERGENCY SERVICE PROVIDER

705

---

STORE CORRECTION INFORMATION INCLUDING AT LEAST THE ONE OR MORE ERRORS IN THE MEMORY

710

---

RECEIVE AN INDICATION TO COMMUNICATE THE MESSAGE TO THE EMERGENCY SERVICE PROVIDER

715

---

CAUSE AN ORIGINAL VERSION OF THE MESSAGE AND A CORRECTED VERSION OF THE MESSAGE TO BE COMMUNICATED TO THE EMERGENCY SERVICE PROVIDER, THE ORIGINAL VERSION TO INCLUDE THE ONE OR MORE ERRORS AND THE CORRECTED VERSION TO INCLUDE CORRECTIONS FOR THE ONE OR MORE ERRORS

TECHNIQUES TO PROCESS TEXT MESSAGES FOR COMMUNICATION TO AN EMERGENCY SERVICE PROVIDER

TECHNICAL FIELD

Embodiments described herein generally relate to techniques to process messages for communication to an emergency service provider.

BRIEF DESCRIPTION OF THE DRAWINGS

FIG. 7 illustrates a fourth example embodiment of a logic flow.

DETAILED DESCRIPTION

Figure 1A:
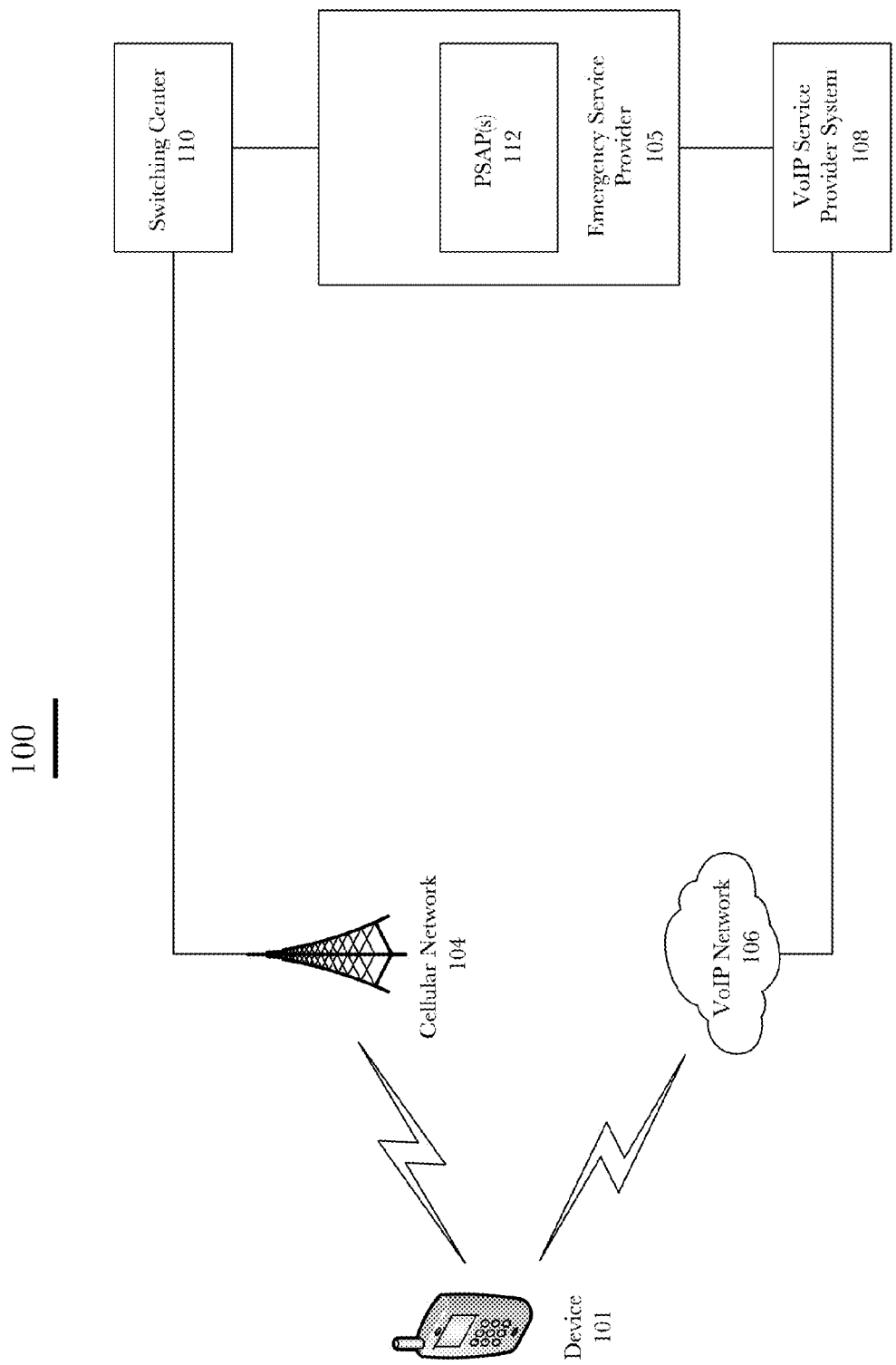
FIG. 1A illustrates an example embodiment of a system.

Various embodiments are generally directed to an apparatus, system and method to process emergency text messages for emergency service providers. For example, embodiments may include enabling communication of an emergency text message via one or more wireless networks, such as a cellular network or a Voice over Internet Protocol (VoIP). Based on the information in the emergency text message, the emergency service provider are able to dispatch emergency service personnel to aid someone experiencing an emergency situation. As can be appreciated, the emergency service provider would like to receive as much and as accurate information as possible about the emergency situation. Thus, embodiments may include providing more than one version of the message to the emergency service provider.

For example, some embodiments may include providing an original version of a message and a corrected version of the message. The original version of the message may include the text of the message as the user inputted it into a messaging application. The original version may include errors, abbreviations, Internet slang (e.g. lol, tbh, thx, np, etc.), and so forth. The corrected version of the message may include results of one or more auto-correction operations performed on the original message attempting to resolve or clarify the errors, abbreviation, and Internet slang. As can be appreciate, auto-correction operations do not always correctly fix errors. For example, an auto-correction may incorrectly change a misspelled word from the intended word to a completely different word having a different meaning. Therefore, providing the emergency service provider with different versions of the same message may enable to more accurately determine the content and intention of the message. These and other details will be discussed further in the following description.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates an exemplary embodiment of an emergency service provider system 100 in which aspects of the present disclosure may be employed. The emergency service provider system 100 may include a number of devices, systems, and infrastructure to enable one or more devices, such as device 101, to communicate with an emergency service provider 105 including one or more Public Safety Answering Points (PSAPs) 112. These communications include voice communication and text communication. Embodiments discussed herein are particularly directed towards processing and handling of text-based messages directed to an emergency service provider.

Further, the emergency service provider system 100 enables communication with an emergency service provider 105 via one or more of a cellular network 104 and a Voice-over Internet Protocol (VoIP) network 106. The device 101 may be communicatively coupled with a cellular network 104, a VoIP network 106, or both and enabled to wirelessly communicate one or more text messages to the emergency service provider 105, for example. Note that the text messages may include Short Message Service (SMS) messages, instant messages (IMs), or any other type of text-based message.

In embodiments, the cellular network 104 may include infrastructure, such as one or more radio service towers, equipment, and devices to process a wireless communication communicated as radio signals. For example, a radio service tower may receive a wireless communication as one or more wireless radio signals from the device 101. The signals may include information destined from the PSAP 112 and may be processed by receiving circuitry, converters, modulators, and so forth. Further, cellular network 104 may also include devices such as switches, routers, and other circuitry to process the received wireless communications. In some embodiments, the cellular network 104 may be communicatively coupled with or include a switching center 110, such as a mobile switching center (MSC) or a short message service center (SMSC). The switching center 110 may receive and route communications to and from the device 101. In the case of an emergency text message, the switching center 110 may determine which of any number of Public Safety Answering Points (PSAPs) 112 the text message should be routed to based, for example, on the location of the device 101 and a defined geographic area for which a particular PSAP 112 is responsible. Generally speaking, this routing can be based on a set of information maintained in a location service database (not shown) within the switching center 110 or elsewhere and accessible by the switching center 110.

In some embodiments, the switching center 110 can provide all or a portion of the calling number, e.g., the area code and exchange number (NPA-NXX numbers), to the location service which can return a set of Vertical and Horizontal (V&H) coordinates for that calling number. The switching center 110 can then use the V&H coordinates to derive a spatial location, e.g., expressed as a latitude and longitude, for the texting or calling number. The spatial location can then be used with a point-in-polygon check by the switching center 110 to determine the particular PSAP 112 that should receive the call or text. In addition, embodiments make use of Local Routing Numbers (LRN) to determine the geographic location of the device 101 who may have ported their number from a different geographic location.

In one example, the device 101 may communicate an emergency text message that can be received by the switching center 110. The switching center 110 may determine a spatial location for the device 101, and once the spatial location of the device 101 has been determined, a PSAP 112 for handling the emergency text can be identified by the switching center 110 based on the determined spatial location for the device 101. For example, identifying the PSAP for handling the emergency call can include the switching center 110 using a point-in-polygon check of the determined spatial location for the calling number against known spatial boundaries for a set of PSAPs 112, e.g., based on longitude and latitude coordinates for each. Once a PSAP 112 for handling the text has been identified, the emergency text message can be routed by the switching center 110 to the identified PSAP 112, which may process the emergency text message and dispatch emergency personnel.

In some embodiments, the emergency service provider system 100 may enable the device 101 to communicate voice communications and text communications via a VoIP network 106 and provide emergency services via a VoIP service provider system 108. The VoIP network 106 includes any number of networking devices and interconnects to enable device 101 to communicate voice, text, and data communications. For example, the VoIP network 106 may include access points, modems, routers, switches, gateways, servers, and so forth to provide an Internet Protocol (IP) network, such as the Internet and/or any other local area or wide area network for sending and receiving calls and text messages including but not limited to emergency texts, e.g., 911 text messages. The devices of the VoIP network 106 may enable communication of information in IP packets, for example, over a switched network.

In embodiments, the emergency service provider system 100 may also include a VoIP service provider system 108, which may receive and route calls, texts, and other communications to and from the device 101. In the case of an emergency text, the VoIP service provider system 108 may determine which of any number of PSAPs 112 the emergency text should be routed to based, for example, on the location of VoIP device, such as an access point and VoIP Gateway and a defined geographic area for which a particular PSAP 112 is responsible. Generally speaking, this routing can be based on a set of information maintained in a database or other storage structure in the VoIP service provider system 108 or elsewhere and accessible by the VoIP service provider system 108. This set of information can include an address associated with each of a set of telephone numbers and may be referenced by the VoIP service provider system 108 when routing an emergency texts from one of the device 101 to appropriate PSAP 112.

Figure 1B:
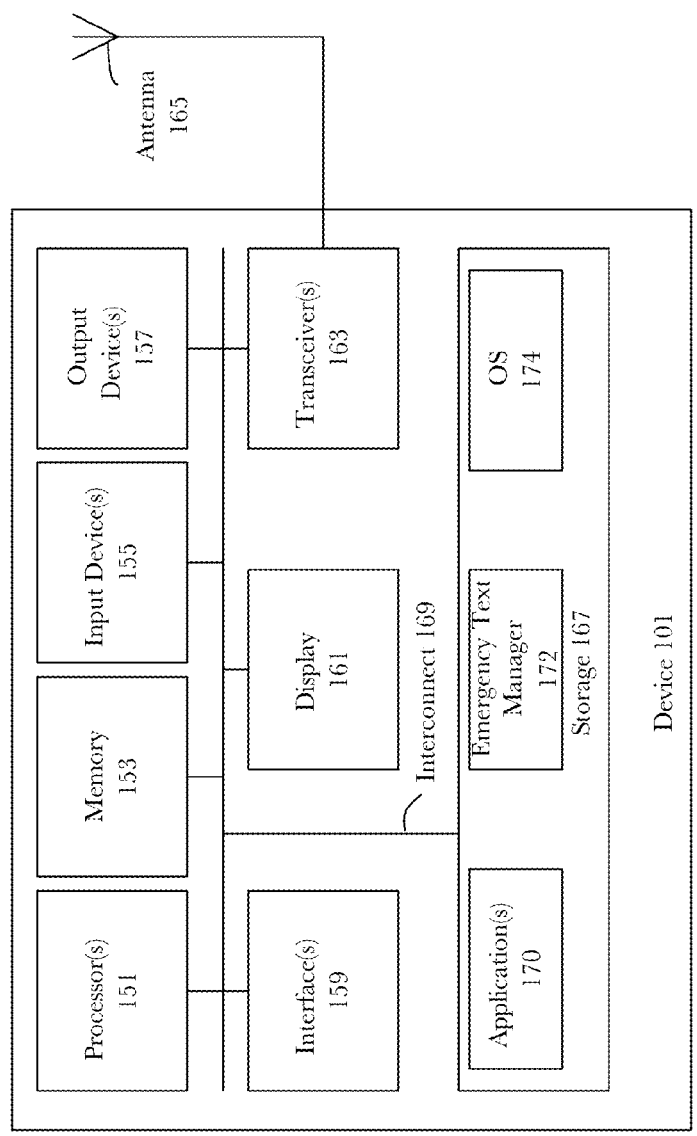
FIG. 1B illustrates a second example embodiment of a system.

FIG. 1B illustrates an example embodiment of a computing system 150 including a device 101 having a number of components to process and communicate information including text messages destined for an emergency service provider 105. Device 101 may be capable of communicating information via both cellular networks 104 and VoIP networks 106 including the Internet.

In various embodiments, the device 101 may be embodied as a communication station, a mobile station, an advanced station, a client, a platform, a wireless communication device, a mobile computer, a laptop computer, a notebook computer, a tablet computer, a server computer, a set-top box, a handheld computer, a handheld device, a Personal Digital Assistant (PDA) device, a handheld PDA device, netbook, a mobile telephone, a smart phone, a mobile cellular telephone, and so forth.

The device 101 may include one or more processors 151 which controls one or more operations of the device 101. A processor 151 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. For example, a processor 151 may include a graphical processing unit (GPU) for processing graphical and video information, in various embodiments. In some embodiments, a processor 151 may be connected to and communicate with the other elements of the computing system via an interconnect 167, such as one or more buses, control lines, and data lines.

The device 101 also includes memory 153 which may be one or more of random access memory (RAM), read-only memory (ROM), electrically erasable programmable read-only memory (EEPROM), flash memory, and hard disk memory. The memory 153 is not limited to these memory components. For example, the memory 153 may include a non-transitory computer-readable storage medium. These memory components can store data momentarily, temporarily, or permanently. The memory 153 stores instructions and data for device 101. The memory 153 may also store temporary variables or other intermediate information while a processor 151 is executing instructions. For example, the memory 153 may store correction information to determine an original message and/or a corrected message for an emergency service provider 105. In some embodiments, this information may be stored in storage 167. These and other details will become more apparent in the following description.

In some embodiments, the device 101 may also include one or more input device 155 and output devices 157. An input device 155 may include one or more buttons, a keyboard, a keypad, a touchscreen display, a touch sensitive device, a microphone, a camera or any other device used for inputting information into the device 101. An output device 157 may be a speaker, a haptic feedback device, one or more light emitting diodes, a buzzer, a vibration device, and so forth. In some embodiments, the device 161 may include one or more displays 161, such as a liquid crystal display (LCD). In embodiments, these and other devices may be coupled with the device 101 via one or more interfaces 159 and communicate with a processor 151 and memory 153 via interconnect 169, for example. An interface 159 can be a parallel port, IEEE 1394 serial port, a game port, a universal serial bus (USB) port, an infra-red (IR) interface, and so forth.

The device 101 may include one or more transceivers 163 coupled with one or more antennas 165 for reception and transmission of information, messages, packets, frames and so forth between other devices. In some embodiments, a transceiver 163 may include a transmitter and a receiver to allow transmission and reception of information and data between the device 101 and a remote location, such as a PSAP 112 via a cellular network 104 and/or a VoIP network 106. The transmitter and receiver may be combined into the transceiver 163. The antenna(s) 165 may be attached to the device 101 and electrically and communicatively coupled to the transceiver 163. The device 101 may also include (not shown) multiple transmitters, multiple receivers, multiple transceivers, and/or multiple antennas. For example, the device 101 may include a first transceiver capable of communicating via the cellular network 104 and a second transceiver capable of communicating via the VoIP network 106.

In embodiments, the device 101 and the transceiver(s) 163 can communicate in a wireless network or VoIP network 106 such as a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing Next Generation mmWave (NGms-D02/r0, Nov. 28, 2008), Wireless Gigabit Alliance (WGA), IEEE 802.11, 802.11a, 802.11b, 802.11e, 802.11g, 802.11 h, 802.11i, 802.11n, 802.11ac, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Maximum Ratio Combining (MRC) transceiver or device, a transceiver or device having "smart antenna" technology or multiple antenna technology, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDMA, Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments may be used in various other apparatuses, devices, systems and/or networks.

In embodiments, the device 101 may also include storage 167 capable of storing information and data. By way of example, storage may be disk drives, optical storage devices, solid-state storage device such as a random access memory ("RAM") and/or a read-only memory ("ROM"), which may be programmable, flash-updateable and/or the like. In embodiments, the storage 167 may store applications 170, an emergency text manager 172, and an operating system (OS) 174 which may be executed by a processor 151 and utilize memory 153 for temporary storage of instructions and data.

In embodiments, the device 101 may include an operating system 174, such as Android®, Apple iOS®, Symbian®, Blackberry OS®, Windows OS®, Palm OS®, and so forth. The operating system 174 may provide and environment and enable other applications 170 to operate within. Further, the device 101 may include any number of applications 170 include games, content applications, media applications, functionality and utility applications, social networking applications, business and productivity applications, lifestyle applications, and communication applications. For example, the device 101 may include a messaging application to enable a user to communicate text communications (messages) via one or more networks 104 and 106. In some instances, a user may desire to communicate a text message to an emergency service provider 105 to report an emergency. In addition or as part of a messaging application, the device 101 may include an emergency text manger 172 to assist in providing text messages to the emergency service provider 105.

The emergency text manager 172 may be part of a messaging application, such as an instant messaging client or SMS messaging client, and/or communicate with the messaging application via an application programming interface (API) to enable various features discussed herein. In various embodiments, the emergency manager 172 may monitor and/or detect whether a message is directed to an emergency service provider 105. For example, the emergency text manager 172 may receive and/or retrieve information, via an API for example, indicating the address of an emergency service provider 105 is indicated in an address field of the messaging application. In another example, the emergency text manager 172 may receive an indication that one or more keywords, such as help, accident, wreck, emergency, and so forth, are within the body of a message and may prompt a user as to whether the text message is to be directed to the emergency service provider 105. Embodiments are not limited in this manner.

In some embodiments, the emergency text manager 172 may enable the device 101 to provide an original version of a message and a corrected version of a message to an emergency service provider 105. Generally, an operator at an emergency service provider 105 desires to receive as much information as possible about an incident. Thus, by providing an original version and a corrected version of a message an operator may determine whether any errors were incorrectly "corrected" in the message and may be able to discern more information than if only a corrected version and/or original version of the message was communicated.

Thus, embodiments may include the emergency text manager 172 storing correction information such as an original version of a message in memory 153 or storage 167 for later communication to the emergency service provider 105. For example, the emergency text manager 172 may detect or receive information indicating that one or more errors are present in a message and store the correction information including uncorrected errors. In some instances, the text manager 172 may determine errors exist based on detection of the errors and an auto-correction operation to be performed on the message. The detection by the emergency text manager 172 may occur in real-time as each error is detected and/or corrected by the auto-correction operation.

In some embodiments, the emergency text manager 172 may store the entire text of a message including the uncorrected errors. Alternatively, the emergency text manager 172 may store only the uncorrected errors and indications of positions or location information indicating a placement of the uncorrected errors in the message. The indications of positions may include a proceeding and/or subsequent word in the message, a word count from the first word, a line indicator and word position in a line of text, and so forth. The correction information may be updated after each detection and/or correction of an error. For example, each error may be detected and/or corrected while a user is typing the words for the message.

In various embodiments, the emergency text manager 172 may detect when a user has completed a message and desires to send the message to the emergency service provider 105.

For example, the emergency text manager 172 may receive an indication, via an API, that a send button has been initiated. Based on the detection, the emergency text manager 172 may cause the original version and the corrected version of the message to be sent to the emergency service provider 105.

In some embodiments, the emergency text manager 172 may receive a corrected version of the message from the messaging application and retrieve the original version of the message stored in memory 153 or storage 167 to send to the emergency service provider 105. In some instances, the emergency text manager 172 may generate the original version of the message based on the uncorrected errors stored in memory 153 or storage 167 and the indications of positions of the uncorrected errors. For example, the emergency text manager 172 may generate the original version of the message by replacing corrected errors in the corrected message with the uncorrected errors based on the location indications. Embodiments are not limited in this manner.

In some embodiments, the emergency text manager 172 may generate a redline version of the corrected message to send to the emergency provider 105. For example, the emergency text manager 172 may receive and/or retrieve the corrected version of the message and insert the uncorrected errors in the corrected version to generate a redline version. In some instances, each uncorrected error may be placed immediately preceding or subsequent a corresponding correction in the corrected message. The placement of the uncorrected error may be based on the indications of positions or locations stored with each uncorrected error. Further, the emergency text manager 172 may provide an indication of the uncorrected error in the corrected message. For example, each uncorrected error may be highlighted in the corrected message by one or more of an underline mark, a pair of brackets, a pair of parenthesis, an italics font, a bold font, and so forth. Embodiments are not limited in this manner and other indicators may be used to highlight the uncorrected errors in the corrected version of the message.

The emergency text manager 172 may provide other features for the device 101. For example, the emergency text manager 172 may control whether corrected errors are presented on the display 161 of the device 101 while an auto-correction operation corrects errors. In some instances, a user may desire to see the original message intended for an emergency provider 105. Thus, the message with the errors may be presented on the display 161 while each error may be corrected, but not presented on the display 161. In some embodiments, the stored correction information may include the corrected message and/or corrected errors and indications of positions of the corrected errors. The stored corrected errors may be used to generate and send the corrected version of the message to the emergency service provider 105. The corrected version of the message, which may or may not include redlines, may be generated and communicated with the original version of the message to the emergency service provider 105 once a user desires to send the message.

Thus, in embodiments, the emergency text manager 172 may store correction information including uncorrected errors and associated positions, corrected errors and associated positions, or both such that it can recreate the original message, the corrected message, or both. In some instances, the correction information may include the entire original version of the message, which may be updated in real-time as a user enters additional text and words. Similarly, the correction information may include the entire corrected message, which may be updated in real-time as a user enters additional text and words and corrections are made. Embodiments are not limited in this manner. These and other details will become apparent in the following description.

Figure 2:
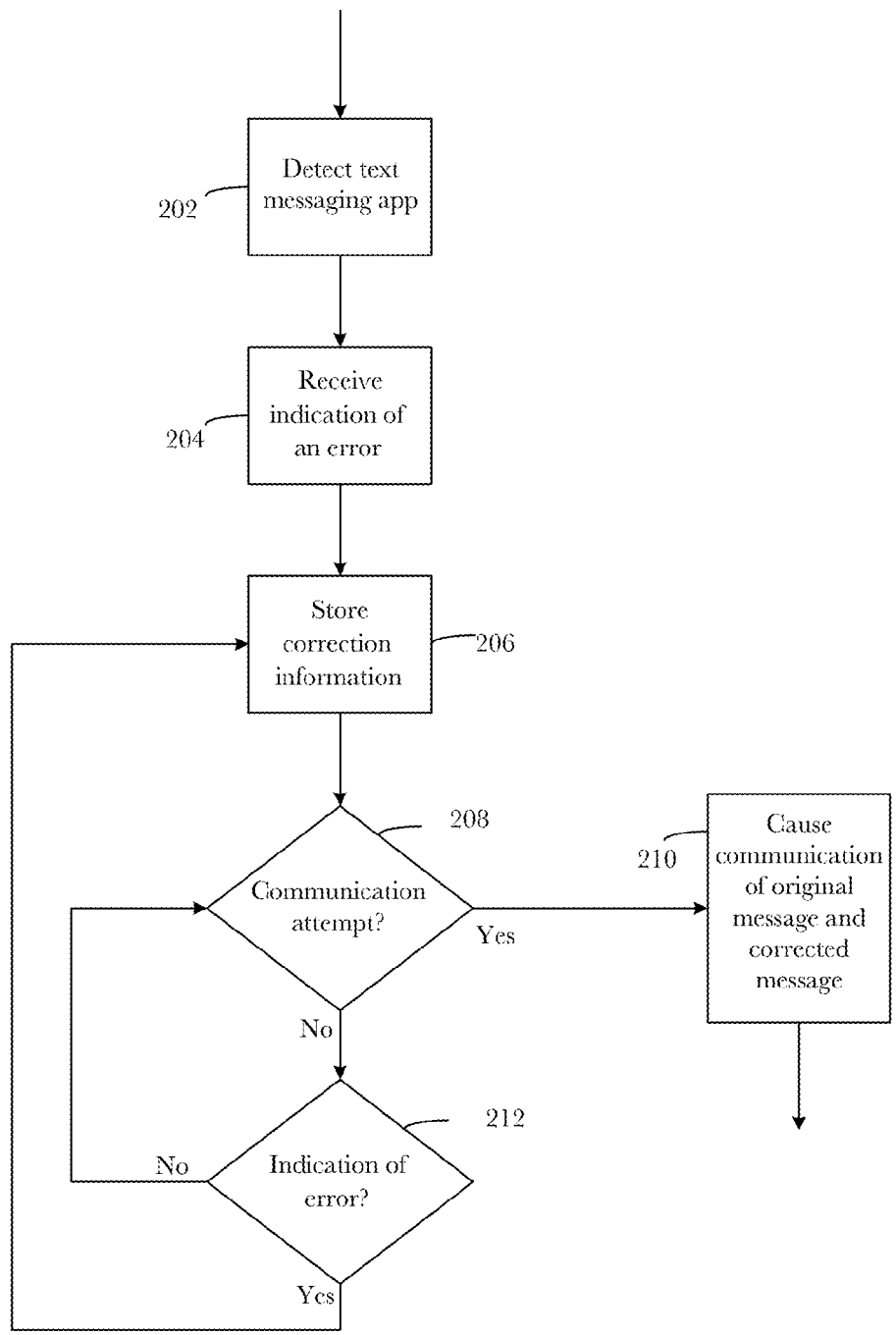
FIG. 2 illustrates a first example of a logic flow.

FIG. 2 illustrates one embodiment of a first logic flow 200. The logic flow 200 may be representative of some or all of the operations executed by one or more embodiments described herein. Further, the logic flow 200 may performed by circuitry and one or more components discussed herein, such as the emergency text manager 172. Moreover, logic flow 200 may be performed in conjunction with one or more other logic flows discussed herein and lists particular steps occurring in a particular order. However, embodiments are not limited in this manner and any step may occur in any order. Further, steps of logic flow 200 are not dependent upon one another and as such particular steps in the logic flow 200 may not occur.

The logic flow 200 may be one example processing flow to cause an original version and a corrected version of a message to be communicated to an emergency service provider. In embodiments, the logic flow 200 may include determining or detecting an execution of a messaging application at block 202. For example, the emergency text manager 172 may include a process that receives an indication that a messaging application has been initiated by a user of a device via an API. The indication may include a process identification for the execution of the messaging application. In some embodiments, the emergency text manager 172 may be part of or "hooked" into one or more messaging applications and also may be initiated when a user executes or initiates a messaging application. In some embodiments, the emergency text manager 172 may also receive an indication that a user desires to send a particular message to an emergency service provider. For example, the emergency text manager 172 may receive an indication via an API when an emergency service provider's address is in an address field of the messaging application. Embodiments are not limited in this manner.

At block 204, an indication of error and/or an indication of an attempt to correct an error may be received. For example, the emergency text manager 172 may receive an indication via the API that an error has been detected by a messaging application or an auto-correction operation. Said differently, the messaging application may communicate information via one or more message using an API when an error is detected in a message. The information may be based on the detection of the error itself, or when auto-correction operation attempts to correct the error. Further, the indication of the error may be receive prior to the correction of the error in some instances. Embodiments are not limited to this example.

At block 206, correction information may be stored in memory or storage for the message. The correction information may include the uncorrected error, such as a misspelled word, a misplaced or incorrect grammar character, formatting errors and so forth. The uncorrected error may be the error before an auto-correction operation has been performed to correct the error. In addition, the correction information may also include an indication of a position or location of the uncorrected error in the message. The indication of position may include one or more of a word count for the error, a line number, a position in a line of text, and so forth. In some instances, the correction information may also include the corrected error, e.g. the result of an auto-correction operation being performed on the error. The correction information may also include an indication of a position or location of a corrected error. In some embodiments, the correction information may include more than just the uncorrected error or the correction. The entire text of a message including uncorrected errors may be stored in memory and/or storage as an original message, for example. Similarly, the correction information may include the entire text of a message including corrected errors as a corrected message in memory and/or storage. Embodiments are not limited in this manner.

At decision block 208, a determination may be made as to whether a user desires to send the message to an emergency service provider. For example, the emergency text manager 172 may receive an indication via an API indicating that a user has invoke a send command using an input, such as a send button. If the emergency text manager 172 determines that the message is to be sent at block 208, at block 210 the emergency text manager 172 may cause both the original message (original version of the message) and the corrected message (corrected version of the message) to be sent to the emergency service provider. In embodiments, the emergency text manager 172 may communicate the original version prior to sending the corrected version of the message. In some embodiments, the original version and corrected version may be sent in the same "message" and have indications indicating which is the original version and which is the corrected version. For example, a title for each version of the message may be added to the message(s).

In some embodiments, emergency text manager 172 may retrieve the entire original message and/or corrected message stored in memory and cause them to be communicated to the emergency service provider. In some embodiments, the emergency text manager 172 may generate the original message, corrected message, or both with uncorrected errors and/or corrected errors stored in memory. For example, the emergency text manager 172 may generate an original message using stored uncorrected errors, indications of position for the uncorrected errors, and a corrected message by replacing the corrections in the corrected message with the uncorrected errors. Similarly, the emergency text manager 172 may generate a corrected message using stored corrected errors, indications of position for the corrected errors, and an original message by replacing the uncorrected errors in the original message with the corrected errors. Embodiments are not limited in this manner. In some embodiments, the corrected version of the message may include redlines, as will be discussed in more detail below in FIG. 3.

If at decision block 208 a communication attempt is not detected, the emergency text manager 172 may wait for a period of time, such as a number of seconds, milliseconds, nanoseconds, and so forth, and make a determination as to whether any additional errors are detected at decision block 212. If no indication of error is detected at block 212, the emergency text manager 172 may continue to wait until the message is communicated or another error is detected. If an error is detected at block 212, the emergency text manager 172 may store correction information based on the detected error and blocks 206-212 may repeat. Embodiments are not limited in this manner.

Figure 3:
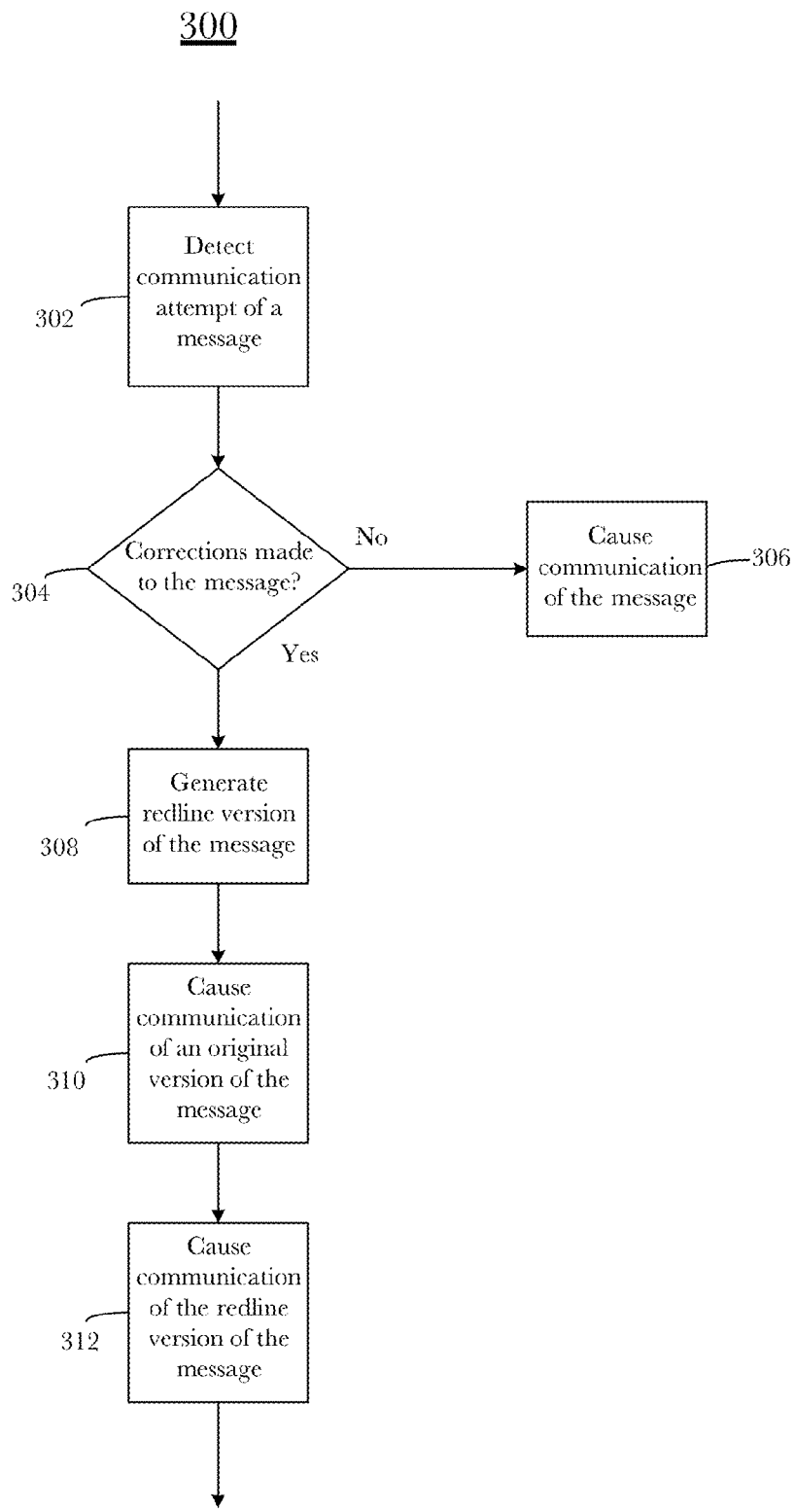
FIG. 3 illustrates a second example of a logic flow.

FIG. 3 illustrates example embodiment of a second logic flow 300. The logic flow 300 may be representative of some or all of the operations executed by one or more embodiments described herein. Further, the logic flow 300 may performed by circuitry and one or more components discussed herein, such as the emergency text manager 172. Moreover, logic flow 300 may be performed in conjunction with one or more other logic flows discussed herein.

The logic flow 300 may be one example processing flow to cause an original version and a corrected version including redlines of a message to be communicated to an emergency service provider. At block 302, a communication attempt may be detected to send a message to an emergency service provider. For example and as previously discussed in logic flow 200, the emergency text manager 172 may receive an indication, via an API, indicating that a user has invoked a send command via an input, such as a send button. At decision block 304, a determination may be made as whether any corrections were made to the message. For example, the emergency text manager 172 may determine whether any correction information for the message is stored in memory and/or storage. If no correction information exists for the message, the emergency text manager 172 may determine that no corrections were made and cause the message to be communicated to the emergency service provider at block 306. However, if corrections were made to the message, a redline version of the message may be generated at block 308. For example, the emergency text manager 172 may generate a redline version of the corrected message, e.g. a redline message, to send to the emergency provider. The emergency text manager 172 may receive and/or retrieve the corrected message and insert the uncorrected errors in the corrected message to generate the redline version of the message. In some instances, each uncorrected error may be placed immediately preceding or subsequent a corresponding correction in the corrected message. The placement of the uncorrected error may be based on the indications of positions or locations stored with each uncorrected error. Further, the emergency text manager 172 may provide an indication of the uncorrected error in the corrected message. For example, each uncorrected error may be highlighted in the corrected message by one or more of an underline mark, a pair of brackets, a pair of parenthesis, an italics font, a bold font, and so forth. Embodiments are not limited in this manner and other indicators may be used to highlight the uncorrected errors in the corrected message. Further and in some embodiments, the corrected errors may be highlighted in the redline version of the message.

At block 310, the emergency text manager 172 may cause the original version of the message to be communicated to the emergency service provider. Further and at block 312, the emergency text manager 172 may cause the redline version of the message to be communicated to the emergency service provider. In embodiments, the emergency text manager 172 may communicate the original version prior to sending the redline version (or corrected version) of the message. In some embodiments, the original version and redline version (or corrected version) may be sent in the same "message" and have indications indicating which is the original version and which is the redline version or the corrected version. For example, a title for each version of the message may be added to the message(s). Embodiments are not limited in this manner.

Figure 4:
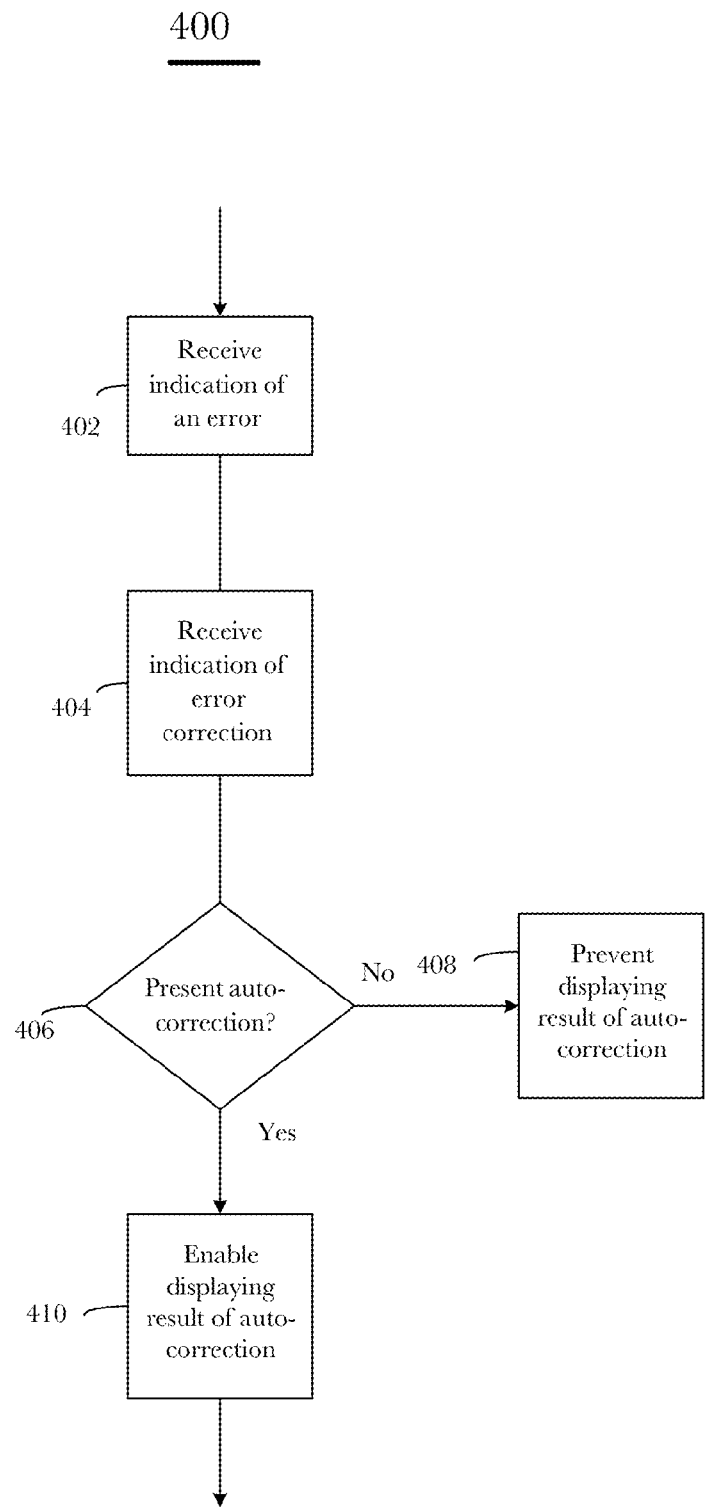
FIG. 4 illustrates a third example of a logic flow.

FIG. 4 illustrates an example embodiment of a third logic flow 400. The logic flow 400 may be representative of some or all of the operations executed by one or more embodiments described herein. Further, the logic flow 400 may be performed by circuitry and one or more components discussed herein, such as the emergency text manager 172. Moreover, logic flow 400 may be performed in conjunction with one or more other logic flows discussed herein.

The logic flow 400 may be one example processing flow to control whether corrections for errors are presented to a user or not presented to a user. At block 402, an indication of an error in a message may be received. For example, an emergency text manager 172 may receive an indication, via an API, that an error has been detected by a messaging application or an auto-correction operation. The indication of the error may be received prior to the correction of the error in some instances. Embodiments are not limited to this example, in some instances the indication may indicate that the auto-correction operation is performing an auto-correction on an error in the message, for example.

At block 404, an indication of completion of an error correction may be received. For example, the emergency text manager 172 may receive, via an API, information indicating that an auto-correction operation has been performed and the error has been corrected. At decision block 406, a determination may be made as whether to present or not present the result of the auto-correction operation on a display. For example, embodiments may enable a user to control a setting such that corrections of errors in messages sent to an emergency service provider are not presented, or vice versa. In some embodiments, the setting may be a default setting or a factory setting. Thus, based on the setting the correction may or may not be presented to a user. Note that in either case the auto-correction may be performed to generate the correction version of the message for sending to the emergency service provider. At block 408, the result of the auto-correction operation is not presented to a user on a display. At block 410, the result of the auto-correction operation is presented to a user on the display. Embodiments are not limited in this manner.

Figure 5:
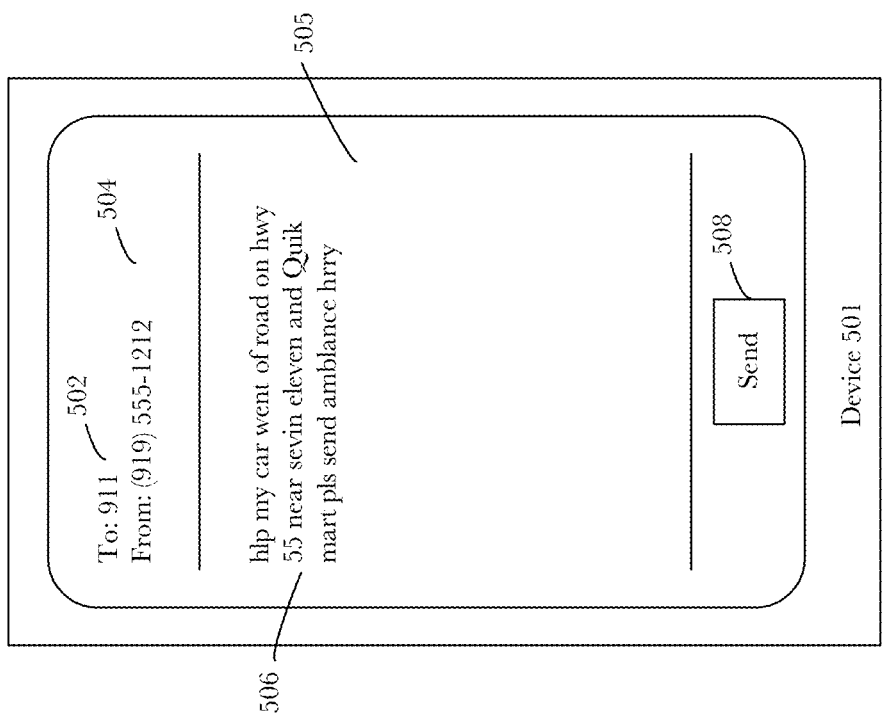
FIG. 5 illustrates an example embodiment of a device.

FIG. 5 illustrates an example embodiment of a device 501, which may be the same as or similar to device 101 discussed. Device 501 may include a number of components including circuitry and logic to provide the features discussed herein. As illustrated, the device 501 includes a display 505 which may present information to a user. The display 505 may be the same as display 161 discussed in FIG. 1B. For example, the display 505 may be a touch-screen display device and may be capable of receiving one or more user interactions.

In the illustrated embodiment, the display 505 is presenting a messaging application to send an instant message or text message to another device or system. The messaging application may provide a graphical user interface (GUI) such that a user may enter information including where to send the message in a recipient address field 502. The address field 502 may be used by one or more components discussed herein, such the emergency text manager 172 to determine whether a message is directed to an emergency service provider or not. For example and as illustrated, the recipient address field 502 may include an address for the emergency service provider, such as "911." The emergency service provider may use the information in the address field 502 to determine the message is directed to the emergency service provider.

The messaging application may also include a sending address field 504 which may include information to identify a sender of the message. In some embodiments, the information may specify one or more of a name of a sender, a return phone number of the send, a determined address for the sender, and so forth. Embodiments are not limited in this manner.

In embodiments, the messaging application may provide a text input area 506 to enable a user to enter text to send as the body of a message. The text may be any combination of alphanumeric characters and symbols. The text may be enter by a user using an input device, such as physical keyboard on the device 501 or a virtual keyboard presented on the display 505.

Moreover, a user may enter text into the messaging application in real-time and the display 505 may be updated in real-time as the user enters information. In some embodiments, the user may enter text including one or more errors which may be presented in the text input area 506. The errors may be corrected, but the results of the corrections may or may not be presented in the text input area 506, as previously discussed.

Figure 6A:
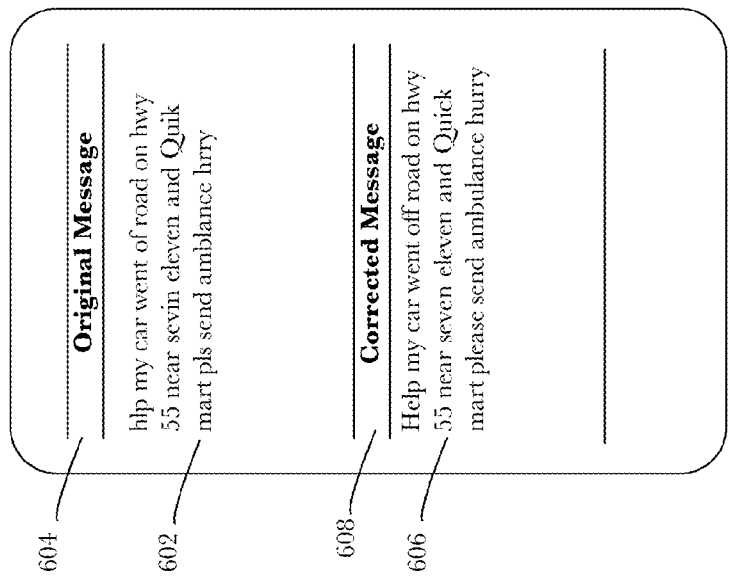
FIGS. 6A/6B/6C illustrate example embodiments of messages.

FIGS. 6A/6B/6C illustrate examples of messages 600, 650 and 675 which may be communicated to an emergency service provider in one or more embodiments discussed herein. Message 600 includes an original message or original version of the message inputted by a user and a corrected message or a corrected version of the message inputted by a user. Messages 650 and 675 includes an original message or original version of the message inputted by a user and a corrected message including redlines or a redline version of the message inputted by a user.

Messages 600, 650, and 675 may be communicated to the emergency service provider as a single message or multiple messages. Thus, the emergency service provider may receive a single message including both the original message and the corrected (or redline) message. However, embodiments are not limited in this manner. For example, the number of characters communicated in a single message may be limited and messages 600, 650, and 675 may be communicated in multiple messages to the emergency service provider.

Figure 6B:
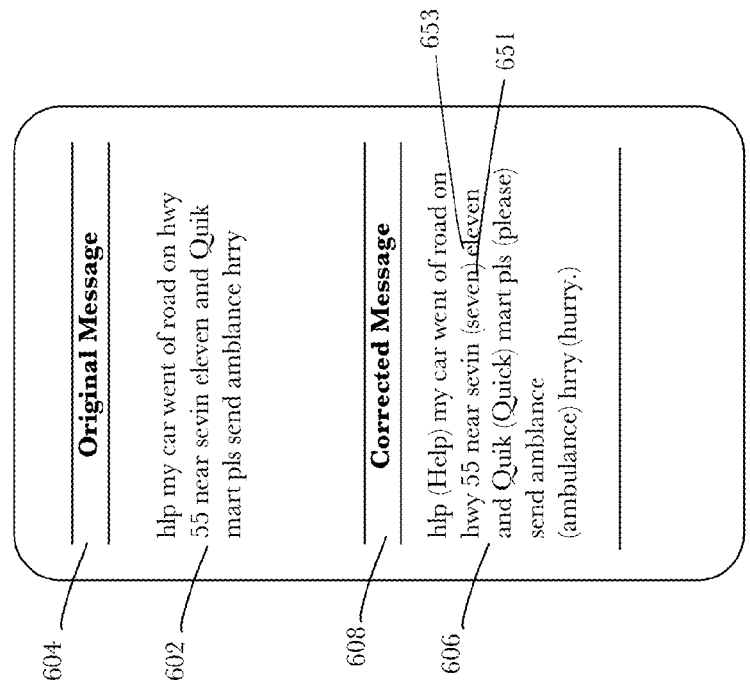
Figure 6C:
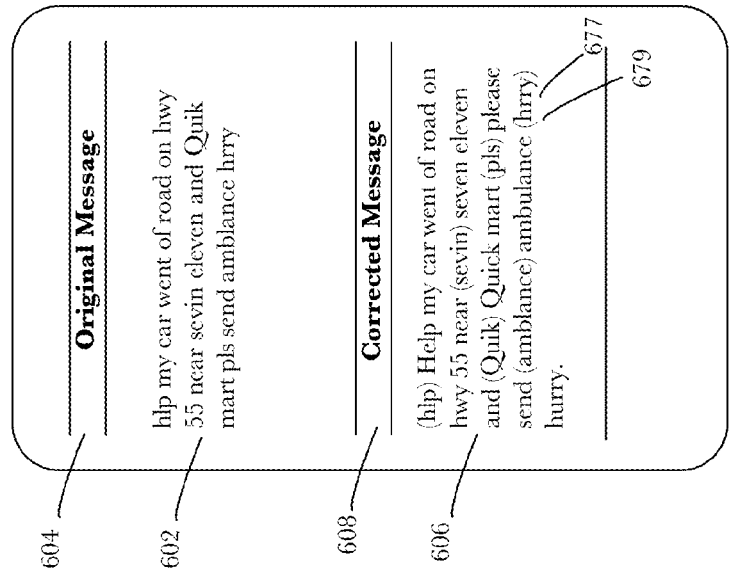

In embodiments, the messages 600, 650, and 675 may include an original version 602 of the message and a corrected version 606 of the message. The original version 602 may be identified by an original text identifier 604 and the corrected version 606 may be identified by a corrected text identifier 608. The original version 602 may include information entered by a user without any error corrections and the corrected version 606 may include information entered by the user with error corrections made by an auto-correction operation, for example. In some embodiments and as illustrated in FIGS. 6B and 6C, the corrected version 606 may include redline text 651 which may be highlighted by redline indicators 653. The redline text 651 may include the corrections in a location proximate to an associated uncorrected errors. Alternatively and as illustrated in FIG. 6C, the corrected message may include redline text 677 which may be the uncorrected text and highlighted by redline indicators 679.

FIG. 7 illustrates one embodiment of a logic flow 700. The logic flow 700 may be representative of some or all of the operations executed by one or more embodiments described herein. For example, the logic flow 700 may illustrate operations performed by systems 100 and 150 and devices 101 and 501. In the illustrated embodiment shown in FIG. 7, the logic flow 700 may include receiving an indication of one or more errors in a message, the message for communication to an emergency service provider at block 705. For example, an emergency text manager may receive information and data in one or more messages via an API from a messaging application indicating that a message being composed includes one or more detected errors. In some embodiments, the emergency text manager 172 may receive an indication after each error is detected in the message or periodically when an error detection routine is operated on the message. Further, the information may include correction information specifying the error, e.g. a misspelled word, and a location or position of the error in the message. In some embodiments, the correction information may also include a correction for the error and a location of the correction in the message. Embodiments are not limited in this manner.

At block 710, the logic flow 700 may include storing correction information including at least the one or more errors in the memory. Moreover, correction information for each detected error and correction may be stored in memory. Thus, an original version of the message and a corrected version of the message may be generated based on the correction information stored in memory. Note that embodiments are not limited to storing the correction information memory and in some instances storage may be used to store the correction information.

At block 715, the logic flow 700 may include receiving an indication to communicate the message to the emergency service provider. For example, the emergency text manager may receive information in one or more messages via an API from a messaging application indicating that a user has invoked a communication (send) routine for the message. For example, a user may tap a send button a display of a device causing one or more messages to be sent to the emergency text manager The logic flow 700 may include causing an original version of the message and a corrected version of the message to be communicated to the emergency service provider, the original version to include the one or more errors and the corrected version to include corrections for the one or more errors, at block 720. For example, the emergency text manager may utilize one or more transceivers to communicate each version of the message to an emergency service provider via a network, e.g. a cellular network or a VoIP network. Embodiments are not limited in this manner.

Figure 8:
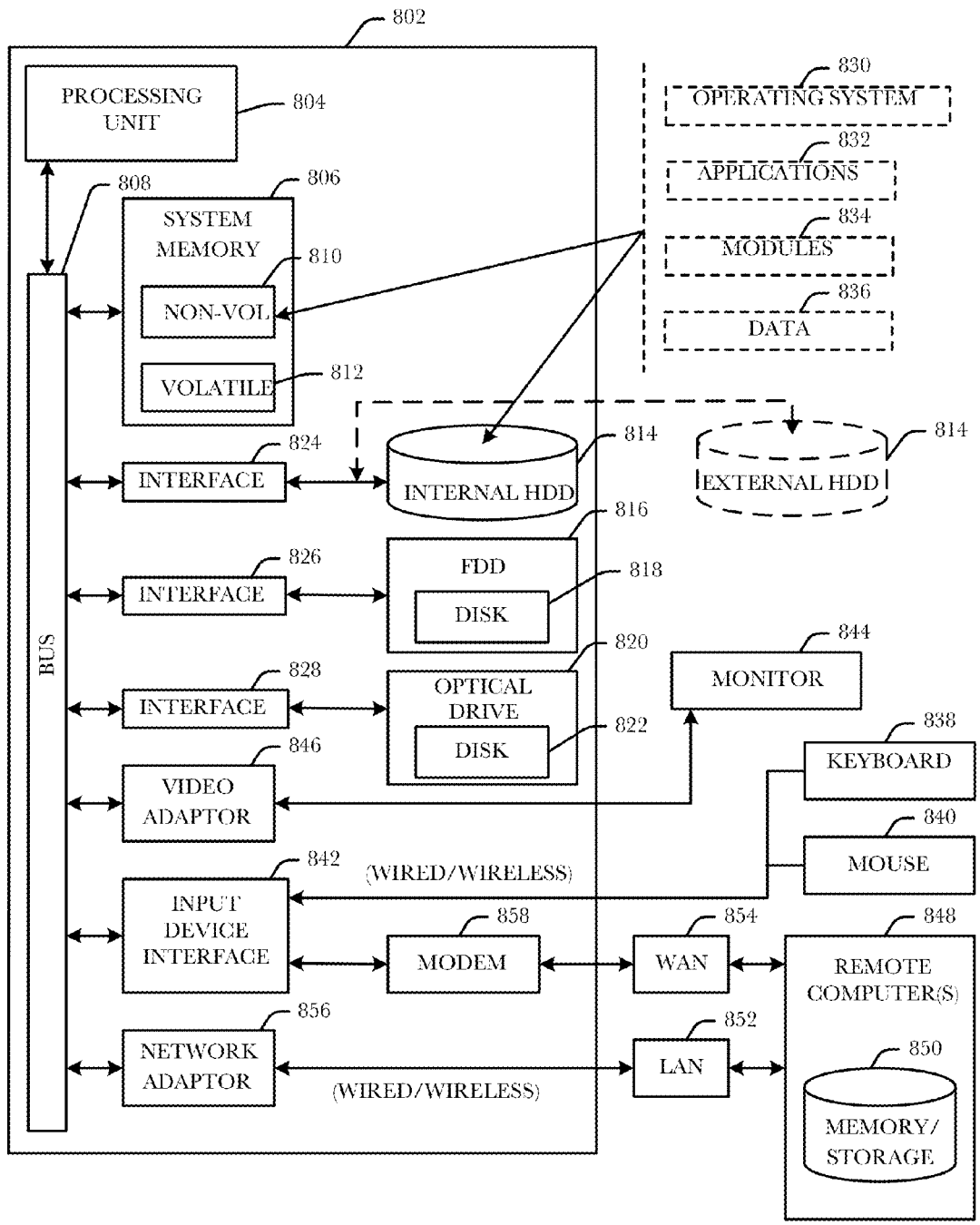
FIG. 8 illustrates an exemplary embodiment of a first computing architecture.

FIG. 8 illustrates an embodiment of an exemplary computing architecture 800 suitable for implementing various embodiments as previously described. In one embodiment, the computing architecture 800 may include or be implemented as part of computing system, such as devices 101 and 501.

As used in this application, the terms "system", "module" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes a processing unit 804, a system memory 806 and a system bus 808. The processing unit 804 can be any of various commercially available processors.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of a system.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the computing devices as previously described with reference to FIGS. 1-8 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   memory;
   logic, at least a portion of which is implemented in circuitry coupled to the memory, the logic to:
      receive an indication of one or more errors in an SMS text message, the SMS text message for communication to an emergency service provider;
      store correction information including at least the one or more errors in the memory;
      receive an indication to communicate the SMS text message to the emergency service provider; and
      cause an original version of the SMS text message and a corrected version of the SMS text message to be communicated to the emergency service provider, the original version to include the one or more errors and the corrected version to include corrections for the one or more errors.

2. The apparatus of claim 1, the logic to include each error in the corrected version of the SMS text message in a location proximate to each associated correction.

3. The apparatus of claim 2, the logic to position each error immediately preceding or subsequent the associated correction in a line of text of the corrected version of the SMS text message.

4. The apparatus of claim 1, the logic to include an indication of each error in the corrected version of the SMS text message.

5. The apparatus of claim 4, the logic to include the indication of each error in the corrected version of the SMS text message, each indication comprising at least one of an underline mark, a pair of brackets, a pair of parenthesis, an italics font, and a bold font.

6. The apparatus of claim 1, the logic to detect errors in real-time and update correction information stored in memory with each detected error.

7. The apparatus of claim 1, the logic to receive address information associated with the SMS text message and determine the SMS text message is destined for the emergency service provider based on the address information.

8. The apparatus of claim 1, comprising:
   a display;
   an interface; and
   a transceiver comprising circuitry to communicate at least one of the original version of the SMS text message and the corrected version of the SMS text message to the emergency service provider in one or more SMS text messages.

9. The apparatus of claim 8, the logic to include an indication of the original version of the SMS text message and the corrected version of the SMS text message in the one or more SMS text messages communicated to the emergency service provider.

10. The apparatus of claim 8, the logic to include an indication of a sender in the one or more SMS text messages communicated to the emergency service provider.

11. The apparatus of claim 8, the logic to prevent a result of an auto-correction operation from being presented on the display.

12. The apparatus of claim 8, the logic to enable a result of an auto-correction operation to be presented on the display.

13. A non-transitory computer-readable storage medium comprising a plurality of instructions that when executed enable processing circuitry to:
   receive an indication of one or more errors in an SMS text message, the SMS text message for communication to an emergency service provider;
   store correction information including at least the one or more errors in the memory;
   receive an indication to communicate the SMS text message to the emergency service provider; and
   cause an original version of the SMS text message and a corrected version of the SMS text message to be communicated to the emergency service provider, the original version to include the one or more errors and the corrected version to include corrections for the one or more errors.

14. The non-transitory computer-readable storage medium of claim 13, comprising the plurality of instructions that when executed enable the processing circuitry to include each error in the corrected version of the SMS text message in a location proximate to each associated correction.

15. The non-transitory computer-readable storage medium of claim 14, comprising the plurality of instructions that when executed enable the processing circuitry to position each error immediately preceding or subsequent the associated correction in a line of text of the corrected version of the SMS text message.

16. The non-transitory computer-readable storage medium of claim 13, comprising the plurality of instructions that when executed enable the processing circuitry to include an indication of each error in the corrected version of the SMS text message.

17. The non-transitory computer-readable storage medium of claim 16, comprising the plurality of instructions that when executed enable the processing circuitry to include the indication of each error in the corrected version of the SMS text message, each indication comprising at least one of an underline mark, a pair of brackets, a pair of parenthesis, an italics font, and a bold font.

18. The non-transitory computer-readable storage medium of claim 13, comprising the plurality of instructions that when executed enable the processing circuitry to detect errors in real-time and update correction information stored in memory with each detected error.

19. The non-transitory computer-readable storage medium of claim 13, comprising the plurality of instructions that when executed enable the processing circuitry to receive address information associated with the SMS text message and determine the SMS text message is destined for the emergency service provider based on the address information.

20. A computer-implemented method comprising:
receiving an indication of one or more errors in an SMS text message, the SMS text message for communication to an emergency service provider;
storing correction information including at least the one or more errors in the memory;
receiving an indication to communicate the SMS text message to the emergency service provider; and
causing an original version of the message and a corrected version of the SMS text message to be communicated to the emergency service provider, the original version to include the one or more errors and the corrected version to include corrections for the one or more errors.

21. The computer-implemented method of claim 20, comprising including each error in the corrected version of the SMS text message in a location proximate to each associated correction.

22. The computer-implemented method of claim 21, comprising positioning each error immediately preceding or subsequent the associated correction in a line of text of the corrected version of the SMS text message.

23. The computer-implemented method of claim 20, comprising the plurality of instructions that when executed enable the processing circuitry to include an indication of each error in the corrected version of the SMS text message.

24. The computer-implemented method of claim 23, comprising wherein the indication of each error in the corrected version of the SMS text message comprising, at least one of an underline mark, a pair of brackets, a pair of parenthesis, an italics font, and a bold font.

25. The computer-implemented method of claim 20, comprising detecting errors in real-time and update correction information stored in memory with each detected error.

26. The computer-implemented method of claim 20, comprising receiving address information associated with the SMS text message and determine the SMS text message is destined for the emergency service provider based on the address information.

* * * * *